United States Patent
Werner et al.

(10) Patent No.: US 11,219,797 B2
(45) Date of Patent: Jan. 11, 2022

(54) REAL-TIME SENSOR BASED BALANCE GAMIFICATION AND FEEDBACK

(71) Applicant: International Business Machines Corporation, Armonk, NY (US)

(72) Inventors: John Werner, Fishkill, NY (US); Eli M. Dow, Wappingers Falls, NY (US); Kavita Sehgal, Poughkeepsie, NY (US); Sneha Varghese, Fishkill, NY (US); Diane Stamboni, Pleasant Valley, NY (US); Nicholas Danyluk, Poughkeepsie, NY (US); Sarah Wu, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/696,558

(22) Filed: Sep. 6, 2017

(65) Prior Publication Data

US 2019/0070460 A1    Mar. 7, 2019

(51) Int. Cl.
| A63B 24/00 | (2006.01) |
| A63B 71/06 | (2006.01) |
| A63B 69/16 | (2006.01) |
| G01C 9/02 | (2006.01) |
| B62K 3/00 | (2006.01) |
| H02J 7/02 | (2016.01) |

(52) U.S. Cl.
CPC .......... *A63B 24/0062* (2013.01); *A63B 69/16* (2013.01); *A63B 71/0622* (2013.01); *B62K 3/00* (2013.01); *G01C 9/02* (2013.01); *A63B 2220/12* (2013.01); *A63B 2220/44* (2013.01); *A63B 2220/803* (2013.01); *A63B 2220/805* (2013.01); *A63B 2220/833* (2013.01); *A63B 2225/50* (2013.01); *A63B 2225/74* (2020.08); *H02J 7/025* (2013.01)

(58) Field of Classification Search
CPC ...... G09B 9/058; A63B 69/16; A63B 24/0062
See application file for complete search history.

(56) References Cited

U.S. PATENT DOCUMENTS

| 7,556,277 | B2 | 7/2009 | Lytle |
| 7,798,513 | B1 | 9/2010 | Salvant |
| 7,951,049 | B2 | 5/2011 | Mondello et al. |

(Continued)

FOREIGN PATENT DOCUMENTS

| CN | 104729527 A | 6/2015 |
| CN | 105678858 A | 6/2016 |

OTHER PUBLICATIONS

Little, Vicki. 'A Parent's Training Wheels For Teaching Your Kid To Ride A Bike'. Aug. 8, 2015. Online tutorial. Retrieved from the Internet. Retrieved on Mar. 27, 2021. (Year: 2015).*

(Continued)

*Primary Examiner* — Peter R Egloff
(74) *Attorney, Agent, or Firm* — Nolan M. Lawrence (57) ABSTRACT

A real-time performance management may be used for cycling. A first computing device retrieves profile data related to a cyclist. The first computing device receives sensor readings from one or more sensors. A first sensor of the one or more sensors detects cyclist tilt. Profile data and the sensor readings from the one or more sensors determine cyclist status. A notification based on the determined cyclist status communicates to a user.

7 Claims, 4 Drawing Sheets

(56) References Cited

U.S. PATENT DOCUMENTS

| | | | |
|---|---|---|---|
| 8,408,910 B2 | 4/2013 | Holljes | |
| 8,825,322 B1* | 9/2014 | Ikemoto | B62M 25/08 701/60 |
| 9,194,955 B1* | 11/2015 | Fahrner | G01S 19/16 |
| 2008/0252038 A1 | 10/2008 | Blomme et al. | |
| 2008/0315553 A1* | 12/2008 | Girout | B62K 19/34 280/287 |
| 2012/0051072 A1* | 3/2012 | Yelverton | B62J 6/00 362/473 |
| 2012/0221204 A1* | 8/2012 | Ichida | B62K 25/04 701/37 |
| 2012/0330572 A1* | 12/2012 | Longman | B62M 3/00 702/44 |
| 2015/0324636 A1 | 11/2015 | Bentley et al. | |
| 2015/0367176 A1* | 12/2015 | Bejestan | G06F 19/3481 482/9 |
| 2016/0031523 A1* | 2/2016 | Tetsuka | B62M 3/16 74/594.2 |
| 2016/0086489 A1* | 3/2016 | Aich | G08G 1/163 340/903 |
| 2016/0221627 A1 | 8/2016 | Hines et al. | |
| 2016/0263439 A1* | 9/2016 | Ackland | A61B 5/4836 |
| 2016/0375958 A1* | 12/2016 | Hashimoto | B62M 9/122 701/58 |

OTHER PUBLICATIONS

Werner et al., "Real-Time Sensor Based Balance Gamification and Feedback", U.S. Appl. No. 15/795,390, filed Oct. 27, 2017.

IBM, List of IBM Patents or Patent Applications Treated as Related, Oct. 25, 2017, 2 pages.

ICBC, "Learn to Ride Smart—Your Guide to Riding Safely", 203 pages, © 2016, Insurance Corporation of British Columbia.

Anonymous, "System and Method to Dynamically Balance a Bicycle Sharing System using a Virtual & Dynamic topology system", An IP.com Prior Art Database Technical Disclosure, IP.com No. IPCOM000227860D, IP.com Electronic Publication Date: May 22, 2013, 4 pages.

Anonymous, "Audio Feedback and Learning for Image Person Recognition Systems", An IP.com Prior Art Database Technical Disclosure, IP.com No. IPCOM000242119D, IP.com Electronic Publication Date: Jun. 19, 2015, 3 pages.

Anonymous, "Follow me bicycle", An IP.com Prior Art Database Technical Disclosure, IP.com No. IPCOM000218113D, IP.com Electronic Publication Date: May 21, 2012, 2 pages.

* cited by examiner

REAL-TIME SENSOR BASED BALANCE GAMIFICATION AND FEEDBACK

BACKGROUND

The present disclosure relates to real-time performance feedback including gamification, and more specifically, to managing cyclist performance based on tilt sensors and assisting in improvement of cycling skills.

Cycling is beneficial to society from both an environmental and financial standpoint. Cycling is typically less expensive than purchasing and maintaining an automobile. Furthermore, there are physical and health advantages for cyclists. Cycling is typically friendlier to the atmosphere. Bicycles were first introduced during the nineteenth century and have now grown in use to over one billion globally.

SUMMARY

According to embodiments of the present disclosure, a method and computer program product are provided for real-time management of cycling. Profile data related to a cyclist is retrieved by a first computing device. Sensor readings from one or more sensors are received by the first computing device. Cyclist tilt is detected by a first sensor of the one or more sensors. Cyclist status is determined based on profile data and the sensor readings from the one or more sensors. A notification can be communicated to a user based on the determined cyclist status.

Also disclosed herein are embodiments of a system for cycling management. A computing device is integrally coupled to a bicycle. The computing device is configured to receive sensor readings from one or more sensors. A first sensor of the one or more sensors detects cyclist tilt. Based on the sensor readings from the one or more sensors, a cyclist status is determined. A notification is communicated based on the determined cyclist status.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to real-time performance feedback including gamification, more particular aspects relate to managing cyclist performance based on tilt sensors and assisting in improvement of cycling skills. While the present disclosure is not necessarily limited to such applications, various aspects of the disclosure may be appreciated through a discussion of various examples using this context.

Cycling is a form of transportation, exercise, sport, and recreation. "Cycling" includes the riding of bicycles, unicycles, quadracycles, tricycles, and may further include motorized vehicles such as motorcycles. The facile mobility of cycling permits cyclists access to trails that automobiles cannot reach because cycling requires less surface area of road space than driving automobiles. It is also easier for cyclists to park because of the increased maneuverability that cycling permits. Additionally, bicycles may be easily transported on bus racks so that commuters may travel to work or school on their bicycles after the bus has permitted them to bypass the safety hazards of riding their bicycles on congested highways. Society as a whole may benefit from cycling due to less consumption of fossil fuels in comparison to automobiles. Cycling is also generally less expensive than purchasing and maintaining automobiles. Human-powered cycling is a form of physical exercise that enhances health and wellness by strengthening muscles, strengthening the cardiovascular system, managing weight, boosting the immune system, preventing stress, and increasing quality of sleep.

A system that enables novice cyclists to learn how to ride may promote or improve the cyclist's self-esteem. Learning to cycle may be both challenging and exhilarating, and at other times, difficult. For example, a person training the cyclist to ride a bicycle does not have all the feedback needed to suggest ways to improve riding. In this situation, the observer (e.g. trainer) might not know the angle at which the bicycle is tilting. The observer also may not know the cyclist's speed. These pieces of information may be particularly important when the cyclist is no longer using training wheels to learn how to ride. Furthermore, the cyclist may be using training wheels and, although it appears to the observer that the cyclist is riding straight, the cyclist is in fact slightly leaning on the left training wheel sixty percent of the time. Here, without a system that enables novice cyclists to learn how to ride, the observer would not be able to give the cyclist proper feedback to help the learning of riding. With a system capable of detecting cyclist tilt and providing feedback, the observer or the novice cyclist would have greater detail that suggests when the cyclist is leaning too far to the right or left and when the cyclist is riding more proficiently. For example, maybe the cyclist rides proficiently when riding downhill but is leaning to the left when going up a hill. Thus, a system for improved cycling skills is beneficial because the observer could more efficiently relay information to the novice cyclist in order to better manage cycling skills.

A system that enables more experienced cyclists to manage and improve their cycling skills may also promote self-confidence and positive reinforcement. Managing and improving one's cycling skills may be exciting, yet difficult because enhancement of one's skills after the learning curve has leveled off may be nominal or unlikely when attempting to progress without help. For example, the cyclist may be a medical student learning to ride a motorcycle after having already learned to ride a bicycle at a young age. This cyclist may be able to ride a bicycle, but is not properly balancing the additional weight of the motorcycle. This cyclist may not need as much guidance as the cyclist who is a novice and has never used a bicycle without training wheels. But the observer monitoring the medical student may have a more difficult time observing the acute leaning angles here than when observing the wider angles of leaning the beginning cyclist may be experiencing. This same example is applicable to a cyclist who can properly ride a bicycle, but wants to experience riding in a different or more efficient way. For instance, an experienced cyclist may want to improve positioning so that her muscles are exercised in the most uniform manner possible, or so that her body is in the least stressful pose. She may also want to improve her posture for proper wind resistance, depending upon which direction and speed the wind is approaching. She may also desire to alter her riding stance in a way that prolongs tire-life. More experienced cyclists may additionally be training for a cycle sport, such as time trialing, mountain bike racing, ultra-distance cycling racing, bicycle motocross, motocross, cyclo-cross, cycle speedway, or track cycling. These advanced cyclists may not be able to improve for many reasons. In some cases, because trainers may not be able to accurately observe the operation of the cycle sports or the adjustments necessary for further improvement are minute and difficult to visually observe. In some cases, because these advanced cyclists may not be able to identify subtle improper operation of their cycle or form. Thus, a system for improved cycling skills is also beneficial for experienced cyclists.

In some situations, novice cyclists may be young cyclists. In the past, these young cyclists have learned to ride a bicycle with the assistance of training wheels, detachable pedals, guard shields attached to crank arms, and training toys without pedals. These training tools may be expensive or bulky, and may only provide help to young cyclists for a short amount of time before they become a hindrance to further cycling training. These past devices have not relayed nor generated messages to cyclists on how to manage their skills based on tilt. Additionally, past devices have not included additional motivational techniques to boost the cyclist's inspiration, such as awarding badges, verbally communicating to the cyclist "good job," and other gamification techniques. Tracking improvement through recorded historical data may now be possible with the use of smart devices.

A user may be either a cyclist or an observer because observers may take part in the real-time performance management of cycling as well. In addition, historical data that may include tilt information may also be transmitted to an observer that is a professional trainer, parent, or friend who may then further assist the cyclist in performance management. Alerts to notify cyclist's guardians may be generated when the cyclist has fallen off the cycle or when a novice cyclist has chosen to ride beyond a predesignated path. Depending on an individual cyclist's goals, gamification may be used to bolster goal progression. Gamification is beneficial because it maintains cyclist interest and makes managing cycling skills more enjoyable for those who may be struggling to learn or keep up, and for those who easily lose interest or find it difficult to remain motivated when no progress or small progress has been made.

Figure 1:
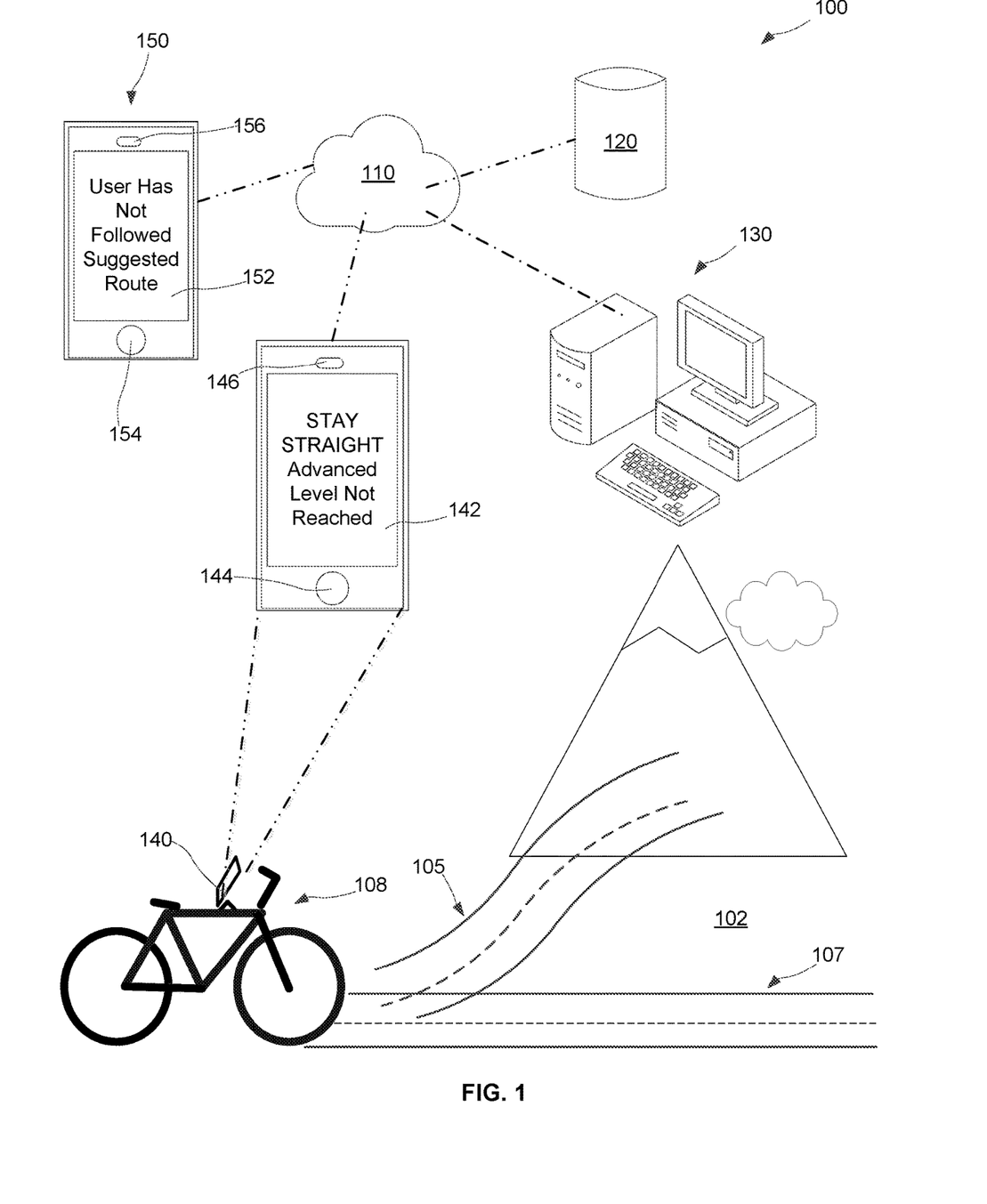
FIG. 1 depicts a cycling environment, integrating a method for real-time performance management of a cyclist, in accordance with embodiments of the present disclosure.

FIG. 1 depicts an advanced cycling system (ACS) 100 operating in a real world environment 102, in accordance with embodiments of the present disclosure. The real world environment 102 may include two roads, a winding road 105 that leads into the mountain and becomes steeper as the road flows up the mountain, and a flat road 107. The winding road 105 that leads into the mountain may be more suitable for a more advanced cyclist, or it may be a great challenge for a beginner after completing certain tasks. The flat road 107 may be ideal for a cyclist who is just learning or who is learning a difficult trick or different posture that the cyclist is not yet completely comfortable with. The flat road 107 may also be ideal for cyclists to perform warm-ups or to just take a leisurely ride for the day. Additionally, it might be raining, so the flat road 107 might be a favorable path for any cyclist in this situation.

The ACS 100, in this example, is incorporated onto a bicycle 108. The ACS 100 may comprise a detachable mobile device that mounts to the bicycle 108 or the ACS 100 may be built into the frame of the bicycle. The bicycle 108 may be a road bicycle, a touring bicycle, a hybrid bicycle, a city bicycle, a flat bar road bicycle, a utility bicycle, a freight bicycle, a mountain bicycle, a racing bicycle, a track bicycle, a triathlon bicycle, a military bicycle, a time trial bicycle, a BMX bike, a cruiser bicycle, a unicycle, a motorized bicycle, a gyroscopic bicycle, an electric bicycle, or a firefighter bicycle. The bicycle 108 may be any other cycle that is ridden based in part on balance provided by a user.

The ACS 100 may include a network 110 (e.g., the Internet), a data store 120, a server 130, a first computing device 140, and a second computing device 150. The network 110 may be a trusted or untrusted network. The network 110 may be protected from unauthorized users. The network 110 may commutatively couple the components of the ACS 100. For example, the network 110 may operate as a wireless network utilizing a Wi-Fi protocol and may send packets of data between the first computing device 140 and the server 130. Additionally, packets of data may also be sent between the first computing device 140 and the second computing device 150. Other computing devices (not depicted) may also be connected through the network 110. For example, the ACS 100 may provide a badge to three competing cyclists after each task is completed. The third cyclist may see that the second cyclist competing against her has three more badges than she does. The third cyclist may then set her goal for the day to complete five additional tasks to surpass the second cyclist.

The data store 120 may be integrally coupled to and formed as part of the first computing device 140. The data store 120 may save data on a local drive or a sharable network drive. The data store 120 may include a storage device, a random-access semiconductor memory, and a volatile or non-volatile storage medium that encrypts programs and data. The data store 120 may comprise a memory that represents the entire memory of the first computing device 140. The data store 120 may also comprise a memory of other computing devices that may be connected by a sharable network drive or through the Internet. Additionally, the data store 120 may include a conceptually monolithic unit memory or a more intricate assembly, such as a hierarchy of caches and other memory components. The hierarchy of caches could be divided further by function in such a way that one cache may maintain directions while a different cache holds different data used by the server 130. Memory within the data store 120 may be allocated and related with different central processing units or with sets of central processing units in a variety of non-uniform memory access architectures. The data store 120 may compile all or a portion of the information collected by the ACS 100.

Some functionalities of the data store 120 for the ACS 100 may include a center for data so that the first computing device 140 may store and retrieve profile data related to a given cyclist, as well as sensor readings from the first computing device, calibration data, cyclist status, and training mode status. Profile data may include cyclist height, cyclist age, profile name, address, bicycle make and brand, bicycle seat height, and the date that the profile was created and last used. The profile data may also include past performance data and information, such as the badges that were achieved and how many miles were traveled when cycling. The data store 120 may also include another user's, competitor's, or teammate's data gathered from the network 110. The ACS 100 may determine from the records in the data store 120 rankings or other types of status that users may be interested in sharing with others.

As sensor readings from an accelerometer, GPS, motion sensor, or light sensor are collected by the ACS 100, this data may also be stored at the data store 120. If the ACS 100 needs to be calibrated so that bumps, turns, or inclement weather does not cause interference, then calibration data may be stored at the data store 120. Cyclist status, including decisions that the ACS 100 has made based on profile data and sensor readings, may be stored at the data store 120 as well. If a user, such as a given cyclist or observer, of the ACS 100 has programmed the ACS to automatically turn on training mode when the cyclist is currently riding, then this information may be stored within the data store 120. If the first computing device 140 is a smartphone, then the training mode may include blocking messages and telephone calls until the detected riding by the cyclist has ended.

In embodiments, the server 130 may include services such as data sharing and system resource sharing among multiple clients. The server 130 may include media servers, database servers, file servers, web servers, game servers, application servers, catalog servers, sound servers, proxy servers, computing servers, communications servers, web servers, fax servers, or mail servers. Components of the server 130 may be replaceable. Additionally, the server 130 could operate as either a client-server model or a peer-to-peer model. Because the server 130 may be connected to the Internet by the network 110, additional data from the Internet may be communicated between the server and the first computing device 140, such as data about the weather. For example, there may be a thunderstorm approaching and weather information from the server 130 may be transmitted to the first computing device 140. Based on the severity of the weather, the first computing device 140 may provide the weather information to the display screen 142. Additionally, the display screen 152 on the second computing device 150 may notify an observer of the user. The second computing device 150 may inform the observer of this notification about the weather through haptic peripherals (e.g. vibrations or force-feedback), visual messages, or audio feedback.

The first computing device 140 of the ACS 100, as a detachable device, may be a wireless cellular phone, a smartphone, a portable accelerometer, or a mobile device capable of detecting tilt. In addition, the first computing device 140 may include a display screen 142, one or more buttons 144, and a speaker 146. The first computing device 140 may include additional components, such as a wireless antenna (not depicted) for communication through the network 110 to the other components of the ACS 100. The data store 120 may assist the first computing device 140 to more effectively attend to the user's preferences over time. As the cyclist provides more information and as more information is collected over time during cycling, the data store 120 may have more data about the user as the user grows and progresses.

For example, after several pink badges are awarded to a female cyclist, the female cyclist may decide that she prefers blue badges instead and may notify the ACS 100 through a user interface on the display screen 142 or through the one or more buttons 144. Additionally, the cyclist may continue to receive audio feedback through the speaker 146 and she may later decide that she prefers visual messages—such as symbols, badges, and/or text—as feedback and notifies the ACS 100 through the one or more buttons 144. Lastly, the cyclist may continue to ride at a faster than optimal speed down hills while slightly tilting. This continual tilt trend may trigger the ACS 100 to notify the cyclist to lean in the other direction. Because the prior stored data parallels the current sensor data currently being received, the ACS may be beneficial to those users attempting to alter old and inefficient habits.

Tilt comprises angle and orientation of the cyclist while riding. Orientation of the cyclist may comprise of a forward, backward, or side configuration. Tilt angle comprises the degree in which the cyclist may be leaning with respect to the ground curvature. Tilt may be calculated based on one or more sensors (not depicted) of the first computing device 140. A given sensor of the one or more sensors may detect real-time tilt readings, which may be referred to as sensor readings. A given tilt sensor may operate with high precision using, for example, microelectromechanical systems (MEMS) sensors. In some embodiments, the first computing device 140 may determine the angle and orientation of the bicycle from additional sensors (not depicted) not connected to the first computing device (e.g. sensors independent of the first computing device). Examples of the first computing device 140 tilt sensors and the additional sensors include accelerometers, gyroscopes, gravity sensors, rotational vector sensors, vibration sensors, position sensors, magnetometers, barometers, and other motion detecting sensors. A goniometer may also be used to calculate tilt angle. In some embodiments, the first computing device 140 may use one or more sensors that detect focal length and distance to hinge point, which may contribute to the detection, calculation, and determination of tilt. In some embodiments, focus distance, hinge line distance, and aperture from a camera sensor (not depicted) of the first computing device 140 may be used to calculate cyclist tilt from the lens tilt.

The display screen 142 may communicate visual messages to a user of the first computing device 140. The display screen 142 may provide certain colors while a user is riding a bicycle 108 so that the user does not need to read while operating a human-powered or motorized cycle. The display screen 142 may operate solely as a display screen or it may operate as both a display screen and a user interface, wherein the user interface is reactive to user input. For example, the user interface of the display screen 142 acts as a touchscreen to permit the user to activate and/or deactivate various features of the first computing device 140. Additionally, a user interface may permit a user to adjust the lighting of the display screen 142 or to change volume or font size of notifications from the first computing device 140 to the user. The first computing device 140 may also contain one or more buttons 144 that may permit the user to dim the screen or to alter other features such as volume or screen brightness. Additionally, the first computing device 140 may also include a speaker 146. This speaker 146 may receive audible commands and transmit audio feedback and may operate as a transceiver. This audio feedback may be stored at the data store 120 and it may be communicated to other computing devices through the network 110. In some embodiments, the audio feedback may be stored by the first computing device 140.

A second computing device 150 of the ACS 100, as a detachable device, may be a wireless cellular phone, a smartphone, a pager, or a mobile device capable of receiving notifications. In addition, the second computing device 150 may include a display screen 152, one or more buttons 154, and a speaker 156. The second computing device 150 may include additional components, such as a wireless antenna (not depicted) for communication through the network 110 to the other components of the ACS 100.

The second computing device 150 may assist a second user in the management and advancement of cycling performance. For example, a second user may be an observer and may be present while a little girl is learning to ride her bicycle 108. The observer may be a parent or guardian, babysitter, older sibling, an aunt or uncle, neighbor, or grandparent. The observer may receive information from the second computing device 150, including the tilt information, about the way in which the little girl is riding her bicycle 108. The little girl may be putting too much of her body weight on one side of her bicycle seat, which causes her to tilt while riding. Because it would not be visibly evident from the observer that the little girl was putting too much weight onto one side of her bicycle 108, the second computing device 150 may communicate to the observer through the display screen 152 information to communicate to the little girl. Because the little girl may be unable to read confidently, the observer is able to effectively inform the little girl what to do. In this way, the observer can assist the little girl in a more efficient way than the observer would have been able to without the second computing device 150. Additionally, this would also better help the little girl manage her performance rather than attempting to use the first computing device 140 on her own.

Continuing the example, the little girl has continued practicing riding her bicycle 108 utilizing the ACS 100. The little girl is now older and wants to take her bicycle 108 for a ride on her own. Now that she is older, she can use her ACS 100 more proficiently without the help and constant supervision of her observer. The little girl may be riding her bicycle 108 in the real world environment 102. The ACS 100 may determine from the cyclist status of the little girl that her riding skills are not yet strong enough for her to ride her bicycle 108 up hills with an angle of thirty degrees from the angle of inclination. The ACS 100 may make the determination from the little girl's past tilt calculations as well as her height, both of which were stored in the data store 120, and additionally from other sensor readings pertaining to the little girl's riding skills that continually save to the data store. The little girl may take a ride on her bicycle 108 down the flat road 107 while her mother is at home. The little girl may come to a point in the flat road 107 where she sees a winding road 105 that continues off into the mountains. The ACS 100 may receive information through GPS data about the altitude and steepness of the winding road 105. The first computing device 140 may display a written message on the display screen 142. The display screen 142 may render a red background indicating a warning. The speaker 146 may provide audio feedback so that the cyclist knows that there is a warning. The speaker 146 may state the written message out loud to the little girl or it may only sound an alarm. The alarm may indicate to the little girl that she needs to stop riding her bicycle 108 and read the displayed message. Additionally, the ACS 100 may warn the little girl through haptic peripherals. The haptic peripherals may communicate force-feedback or vibrations to the little girl on the handle bars, pedals, or on the seat of the bicycle 108.

Continuing the example further, the little girl may decide to ignore the warning. The little girl may choose to ride her bicycle 108 down the winding road 105. The first computing device 140 may continue relaying its warnings to the little girl. At the same time, the second computing device 150 may warn the mother while the mother is still at home. The second computing device 150 may display a written message on the display screen 152. The display screen 152 may have a flashing red background to denote a warning. The speaker 156 may provide audio feedback so that the mother is aware that there is a warning, in case she is in the other room cooking dinner and is not facing her phone at the time. The speaker 156 may state the written message out loud to the mother or it may only sound an alarm. Additionally, the second computing device 150 may warn the mother through haptic peripherals. The haptic peripherals may communicate force-feedback or vibrations to the mother. This may be beneficial if the mother has her phone in her purse and is not able to hear the notifications but can hear the vibrations on the table that the purse is sitting on. Once the mother has been notified, she may use one or more buttons 154 on the second computing device 150 to silence the alarms. The second computing device 150 may receive the alarms as a notification and the mother may see the alarms along with notifications from other applications, phone calls, text messages, etc.

Alarm notifications may vary in degree. For example, an alarm system to notify the cyclist that the position of the handle bars is not proper may be a milder notification than the notification that the mother would receive from the second computing device 150 when the cyclist is likely to fall off her bicycle 108. The ACS 100 may provide only a slight haptic peripheral notification to the user on the bicycle 108 through the seat when signaling to the cyclist that the cyclist is shifting her weight too much to the left. The ACS 100 may also notify the cyclist by sending a slight haptic peripheral notification from the right handlebar on the bicycle 108 when the cyclist has her hand placed too far to the exterior of the handlebar. The ACS 100 may send the observer only a visual message on the display screen 152 for these types of notifications. In drastic situations, such as when the cyclist is about to fall, the ACS 100 may also send haptic peripherals, audio feedback, and visual messages to the observer.

The cyclist may have worn her helmet (not depicted). Helmets may protect the cyclist's head and additionally may have short range network antenna and protocol incorporated, such as Bluetooth through a network antenna. With the assistance of the short range network, the cyclist may be able to communicate to her observer, who is using the second computing device 150. This is beneficial to the cyclist, especially in emergency situations, where the cyclist is not capable of reaching the first computing device 140 or a mobile device in order to receive help. The helmet may also receive notifications from the first computing device 140 so that the cyclist need not look to her screen while riding, which may increase safety. The cyclist may also receive notifications from the first computing device 140 to other wearables, such as a smart watch or wireless headphones.

Figure 2:
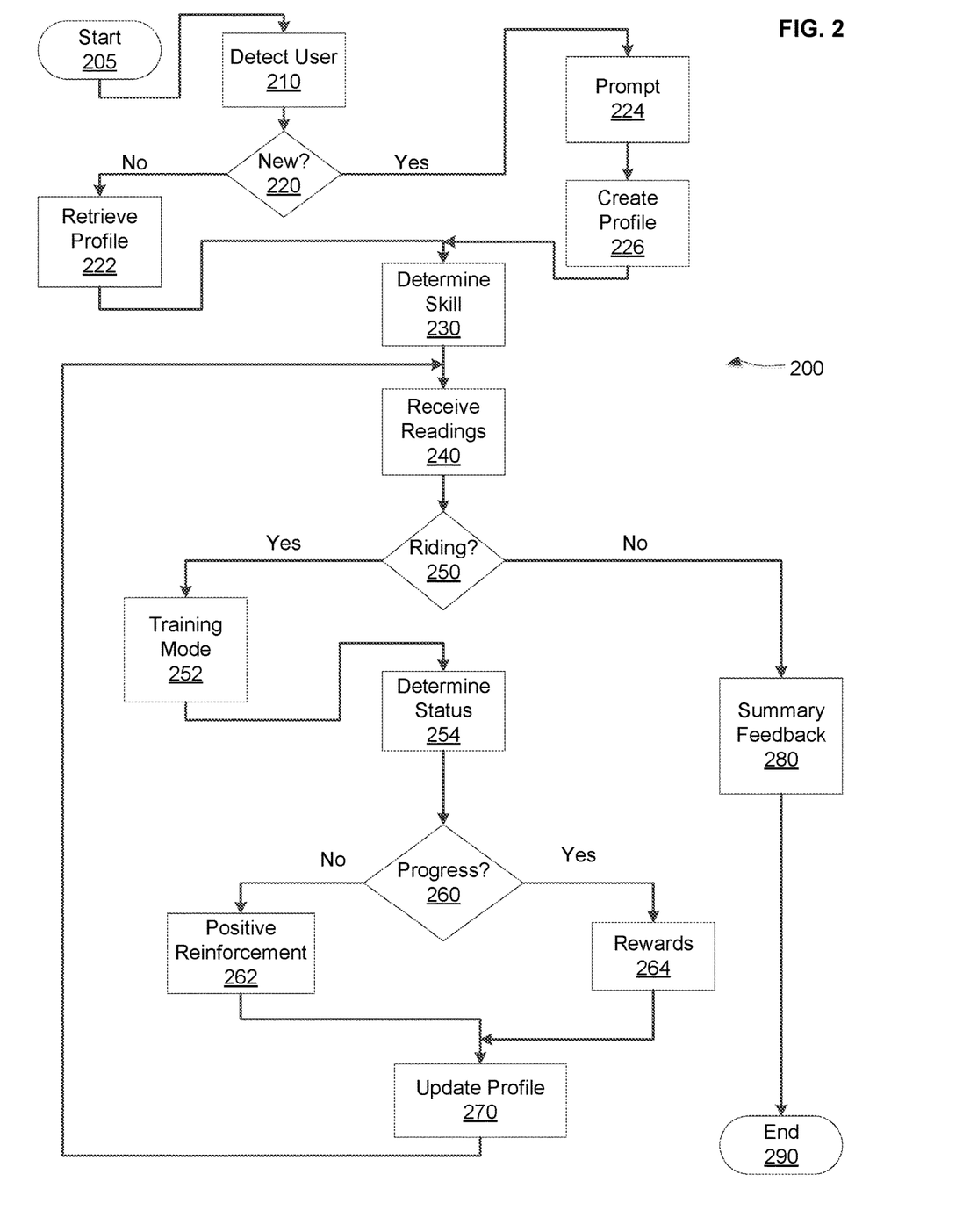
FIG. 2 depicts an example method for real-time performance management of a user, consistent with embodiments of the present disclosure.

FIG. 2 depicts an example method 200 for real-time performance management of a user, consistent with embodiments of the present disclosure. Method 200 may be executed by a computing device, such as discussed in FIG. 1. Method 200 may be executed by one or more of the computing devices, simultaneously or at separate times. Method 200 may also be executed by the computing device of one or more users, for example, a cyclist and an observer. Method 200 may include more or less steps than those depicted. Method 200 may be executed continuously, such as many times serially (e.g. every ten milliseconds, every sixteen milliseconds).

From start 205, a user may be detected at 210. The user may be detected at 210 in response to receiving user input from the user. The user input may be in the form of physical input from touching a button on a given computing device, shaking the computing device, or launching an application from a user interface of the computing device. In some embodiments, the user input may be in the form of verbal input from a user speaking into a microphone or speaker of the computing device. The user may be detected at 210 based upon movement received from one or more sensors. The movement received from the one or more sensors may be indicative of a user beginning to ride or currently riding a cycle.

Detecting a user at 210 may include requesting information from the user when the user is the cyclist. The request of information may be an information prompt about the experience of the cyclist. The prompt may be transmitted by a first or second computing device through a visual message, such as a written message or symbol on a screen, or through an audio message, such as verbal communication by a speaker. The audio message may also be transmitted by a short range network protocol to a wearable device, such as by using a Bluetooth protocol. The wearable device may include a safety helmet or wristband apparatus, such as a smart watch.

If the user is not a new cyclist at 220, then a profile may be retrieved at 222. The retrieved profile at 222 may be retrieved from local storage, a backend server, or from a shared network drive. Profile data related to a cyclist, from the retrieved profile at 222, may include cyclist body length, cyclist age-group, profile name, geographic location, bicycle make and brand, bicycle seat height, and the date of profile creation. The profile data may also include past performance data and information that had been stored after the user last cycled. For example, the user may have cycled at a speed of ten miles per hour, which was stored by method 200, to an off-site server, and the speed may be retrieved at 222.

If the cyclist is a new cyclist at 220, then the user may be prompted for information at 224, such as user height. After prompting the user for information and receiving a response at 224, a profile may be created at 226. In some embodiments, creating profile information at 226 may include transmitting to a connected server the profile information retrieved in operation at 224. Created profile information at 226 may be stored to a non-volatile memory of a computing device. Profile information may be created at 226 by partial profile data, such as when a user only provides some answers to the prompts at 224. In embodiments, where the profile is created at 226 based on incomplete data from the user, the user may be later prompted again at 224 to provide the missing data.

Method 200 may continue by determining the skill of the user at 230. Measurements of leg-length and user age, from the created profile at 226 or the retrieved profile at 222, may be used to determine skill at 230, such as proper seat height. Determined skill at 230 may also include skill level. For example, if the user had just completed skill level fourteen during her last training session, the user may now be moving forward to skill level fifteen today. Skill level may be indicative of specific time or distance completed by the cyclist, such as forty miles of riding or riding for five hours. In addition, skill level may indicate cumulative skill of the cyclists, such as total time cycled over several days or total miles cycled per year. For example, a cyclist at level four may have cycled ninety miles in one week. Skill level may also be indicative of specific cycling scenarios that the cyclist has successfully completed. For example, whether the cyclist has advanced to cycle in the rain or up steep hills. Skill level may vary depending upon age or depending upon whether the cyclist is learning to cycle or training for a competition such as a marathon.

At 240 one or more sensor readings may be received related to the cycling. Sensors may be integrally coupled to a first computing device (e.g. the first computing device such as discussed in FIG. 1) or a second device, such as a computing device or a device capable of transmitting sensor readings at 240. Sensors may comprise motion sensors, including accelerometers, gravity sensors, gyroscopes, vibration sensors, position sensors, and rotational vector sensors. Sensors may also comprise goniometers, magnetometers, and barometers. Camera sensors, GPS, position sensors, and environmental sensors comprising sensors that detect temperature, air pressure, elevation, and humidity, may also provide sensor readings at 240. The sensor readings may be received at 240 from force, pressure, or biometric sensors that may be located on the handlebars, frame, wheels, pedals, or seat of the cycle.

Sensors may be powered by a wireless charging device, such as additional batteries or by vibration-to-electricity microelectromechanical systems (MEMS) for sensors to operate without losing power. Powering sensors by MEMS may prolong operation of a device that performs method 200 with respect to the receiving sensor readings at 240. For example, a cyclist may be riding for several miles and she may want her handlebar sensor to receive sensor readings at 240 for the entire journey so that she may be aware if her hands are in optimal position during inclined and declined riding. Additionally, radio-frequency identification may be used to power sensors. Some embodiments may have both sensors and devices for powering these sensors built into the cycle.

A determination may be made whether riding is occurring or in progress at 250. The determination at 250 may occur through sensor readings at 240 received by a device that performs method 200. Additionally, determining riding is occurring or in progress at 250 may be conveyed by a user, such as by touching a button, shaking, or launching an application from a user interface of a computing device. In some embodiments, the determining made at 250 may be transmitted from a first device to a second device operating consistent with method 200. In some embodiments, the determination made at 250 may be based on verbal input from the user speaking into a microphone or speaker. In some embodiments, the method 200 may already be built into the cycle and the determining riding at 250 may occur once the pedals begin turning.

If the riding is occurring or in progress at 250, then training mode may begin at 252. The training mode may be entered into at 252 automatically based on determination that riding is in progress at 250. Training mode may begin at 252 by a user touching a button on the computing device, shaking the first computing device or second device, or launching an application from a user interface of the computing device. In some embodiments, training mode may begin at 252 after verbal input from the user speaking into a microphone or speaker of the first computing device or second device. Training mode at 252 may block, prevent, suppress, or otherwise delay notifications from being provided to the users. The blocking of notifications may be a safety feature that prevents distractions so that the cyclist may pay attention to cycling. For example, if a first computing device is a smartphone, then the training mode at 252 may include blocking messages, notifications, and/or telephone calls until the detected riding by the cyclist is no longer in progress.

Cyclist status at 254 may be determined through one or both of the received sensor readings at 240 and the determined skill at 230 (from the created profile at 226 or the retrieved profile at 222). Cyclist status at 254 may include information such as whether or not the user has taken sufficient breaks from riding. Cyclist status at 254 may also include the optimal body position to cycle that relieves the user from the most stress on the shoulders through the received sensor readings at 240, which may have included environmental sensors detecting temperature, air pressure, and humidity. Optimal body positions of the determined cyclist status at 254 may alter with respect to varying humidity and air pressure.

Determining cyclist status at 254 may include determining that the cyclist is improving compared to past performance. In a first example, sensor readings at 240 may suggest that a cyclist is consistently balancing the bicycle because the readings indicate that the cycle never leans to the left or right more than three degrees from straight up and down. In a second example, sensor readings at 240 may suggest that a cyclist is no longer slouching too far forward while cycling. Additionally, determining cyclist status at 254 may include determining that the cyclist status (e.g. cyclist performance) is plateauing (e.g., not really improving or getting worse). For example, sensor readings at 240 may suggest that a cyclist is cycling up twenty degree incline hills slower than before. Determining cyclist status at 254 may be based on tilt as well as other factors (e.g., speed, incline of the road, etc.). For example, a tilt that may be indicative of a dangerous tilt at one speed may not be the same at another speed. Data retrieved from the profile at 222 may have been used to determine this cyclist status at 254. As the sensor readings at 240 assist in the determination of cyclist status at 254, progressing at 260 may then be based on the determined cyclist status at 254. Progressing at 260 may include various degrees of progression, including rate of progression from level to level in comparison to past efforts, rate of progression compared to others, and rate of goal completion with respect to the difficulty of the challenge compared to past goals.

If a cyclist is not progressing at 260, then the cyclist may be provided with positive reinforcement at 262 to bolster encouragement. Positive reinforcement at 262 may be provided to a user working towards a certain goal at a slow rate. Positive reinforcement at 262 may be provided to a user when the cyclist status (e.g. cyclist performance) is plateauing (e.g., not really improving or getting worse). Positive reinforcement at 262 may include audio or visual messages that state "keep going" or "you are almost there." Positive reinforcement at 262 may be related to the tilt of the bicycle from the sensor readings at 240, such as "lean more to the right side" or "you can do it, sit up straight." Visual messages may include a flashing red light to indicate that cycling performance is not optimal. Visual messages may also include stickers for time and effort put forth. Additional points may be collected for the time and effort put into an attempt at completing a level or task. Positive reinforcement at 262 may include haptic peripherals that notify the cyclist that cycling performance is not optimal.

If the cyclist is progressing at 260, then the cyclist may be provided with rewards at 264. The rewards at 264 may be provided local to a computing device executing method 200, such as badges and stars through a display of the computing device. The rewards at 264 may be shared online with others through a social network. Other rewards at 264 may include awards or discounts at partnering or supporting companies after the completion of certain tasks. Age information from the retrieved profile at 222 or the created profile at 226 may contribute to the type of rewards at 264. For example, the seven-year-old user may prefer audio feedback as a reward at 264 when she is doing a good job to enhance her level of satisfaction, such as "good job and keep up the good work." An older user, on the other hand, may not prefer the audio rewards at 264 that the younger user may prefer. Additionally, the rewards at 264 may be related to the gender of the user, such as by utilizing badges of a color designated to a specific gender. An observer may receive both positive reinforcement at 262 and rewards at 264 that the cyclist receives. In this way, the observer may track how the cyclist is progressing at 260. Both positive reinforcement at 262 and rewards at 264 may be communicated visually, by audio feedback, or by haptic peripherals to an observer through a first computing device, a second computing device, or a wearable device.

Training mode at 252 may suppress badge and visual message rewards at 264, as well as positive reinforcement at 262, until riding is no longer in progress at 250. An observer may utilize a second computing device (e.g. the second computing device such as discussed in FIG. 1) by controlling training mode at 252 to block, prevent, suppress, or otherwise delay notifications from being provided to the cyclist. For example, if a first computing device is a smartphone, the observer may want to block all messages and telephone calls that may be sent to the first computing device of the cyclist while the riding is in progress at 250. In addition, the observer may want to block all messages and telephone calls except those that are sent from the second computing device of the observer.

The user profile may be updated at 270 as method 200 continues receiving sensor readings at 240, determining cyclist status at 254, and providing positive reinforcement at 262 or rewards at 264. The profile may be updated at 270 by storing the achievement of the badges and rewards. In some embodiments, the achievement of badges and rewards may be stored locally on a device executing method 200. In some embodiments, the achievement of badges and rewards may be stored by sending the achievement to a server communicatively coupled to a device executing method 200. Method 200 may continue to update the user profile at 270 until the receiving sensor readings at 240 are indicative that the riding is no longer in progress at 250.

If it is determined that riding is no longer in progress at 250, then the user may be provided summary feedback at 280. The user may include a cyclist or an observer. Summary feedback to user at 280 may include information pertaining to determined skill at 230, determined cyclist status at 254. Summary feedback may include information from the profile updated at 270 that contains positive reinforcement at 262 and rewards at 264. Summary feedback at 280 may be communicated to a user or observer through audio feedback, visual messages, and haptic peripherals. Wearable devices incorporating additional sensors may transmit summary feedback at 280 to and from local storage, a backend server, or from a shared network drive. The wearable devices may communicate summary feedback at 280 to a user. Examples of wearable devices include a safety helmet with Bluetooth headphones, or a two-way radio worn by the user, as well as a wrist or neck bands with notification capabilities. Wearable devices may communicate determined cyclist status at 254, positive reinforcement at 262, and rewards at 264 before the communicated summary feedback at 280.

In some embodiments, summary feedback at 280 may be communicated to and between users. For example, two cyclists may be competing against one another. The two competing users may notify each other through the wearable device while riding is in progress at 250 when they have reached the next level. This interaction may promote and motivate users to continue to complete tasks. The next day, the first cyclist may be logged into a shared network at home on her computer and may notice that her work colleague is one level ahead of her from the summary feedback at 280 being presented to a desktop computer of the user. She may then set out to achieve three additional levels for the day. Summary feedback at 280 may also be communicated more than once. For example, the observer may be notified each time that the user has completed a level.

Additionally, both cyclists and observers may receive summary feedback at 280 in response to sensor readings at 240. For example, the observer may be the mother of a cyclist minor who has just learned to cycle on her own. The observer may want to set the cycling route for her daughter or monitor her daughter's location as she cycles throughout the neighborhood. The sensor readings received at 240, such as from a GPS, may be communicated to the observer as notifications corresponding to the daughter's location. The observer may receive the notifications by audio feedback, visual messages, or haptic peripherals (e.g. force feedback or vibrations). Sensor data may also be received at 240 from a camera sensor. Utilizing method 200, the observer may view the received camera sensor data at 240 as her daughter cycles through the neighborhood. In some embodiments, the wearable devices may permit users and observers a safe way to communicate while riding is in progress at 250. In some embodiments, if positive feedback at 262 or rewards at 264 were suppressed by training mode at 252, then they could be provided to the observer while riding is in progress at 250 and/or part of the summary feedback communicated at 280.

Summary feedback at 280 may also include video transmissions to an observer. For example, a cyclist may be cycling throughout a mountain trail. The observer may see her favorite bird through the video transmissions from the cyclist as the cyclist is cycling. The observer may capture the bird image using her device at home. Her device at home may be capable of receiving the video transmissions through camera or video sensor data at 240. The bird image may be captured from a device, of the observer or cyclist, capable of receiving camera or video sensor data at 240. Additionally, the observer may view the cyclist's feet through received sensor readings at 240 from a camera sensor positioned to view cyclist's feet. Because a given cyclist's feet should barely touch the ground, the observer may inform the cyclist that her seat height is improper by viewing the positioning of the cyclist's feet. In this way, the observer may be home preparing breakfast while monitoring the cyclist. After summary feedback to user at 280 has been relayed to the user, method 200 may end at 290. In some embodiments, feedback such as video transmissions may be provided to the observer while riding is still in progress.

In some embodiments, an observer may supplement the summary feedback to user at 280, such as by sending text or voice messages or by telephoning the cyclist. The observer may become aware that method 200 has come to an end at 290 by the received sensor readings at 240 from the camera sensors. Riding that is no longer in progress at 250 may also be determined by other received sensor readings at 240 (e.g. motion sensors). In addition to telephoning, the observer may notify the cyclist through a shared network. For example, the observer's audio feedback may be sent to the cyclist through the speakers of a first computing device, through Bluetooth in the helmet of the cyclist, or through a wearable device worn by the cyclist. In this way, an observer may be preparing dinner at home while monitoring and critiquing the cyclist's activities.

Figure 3:
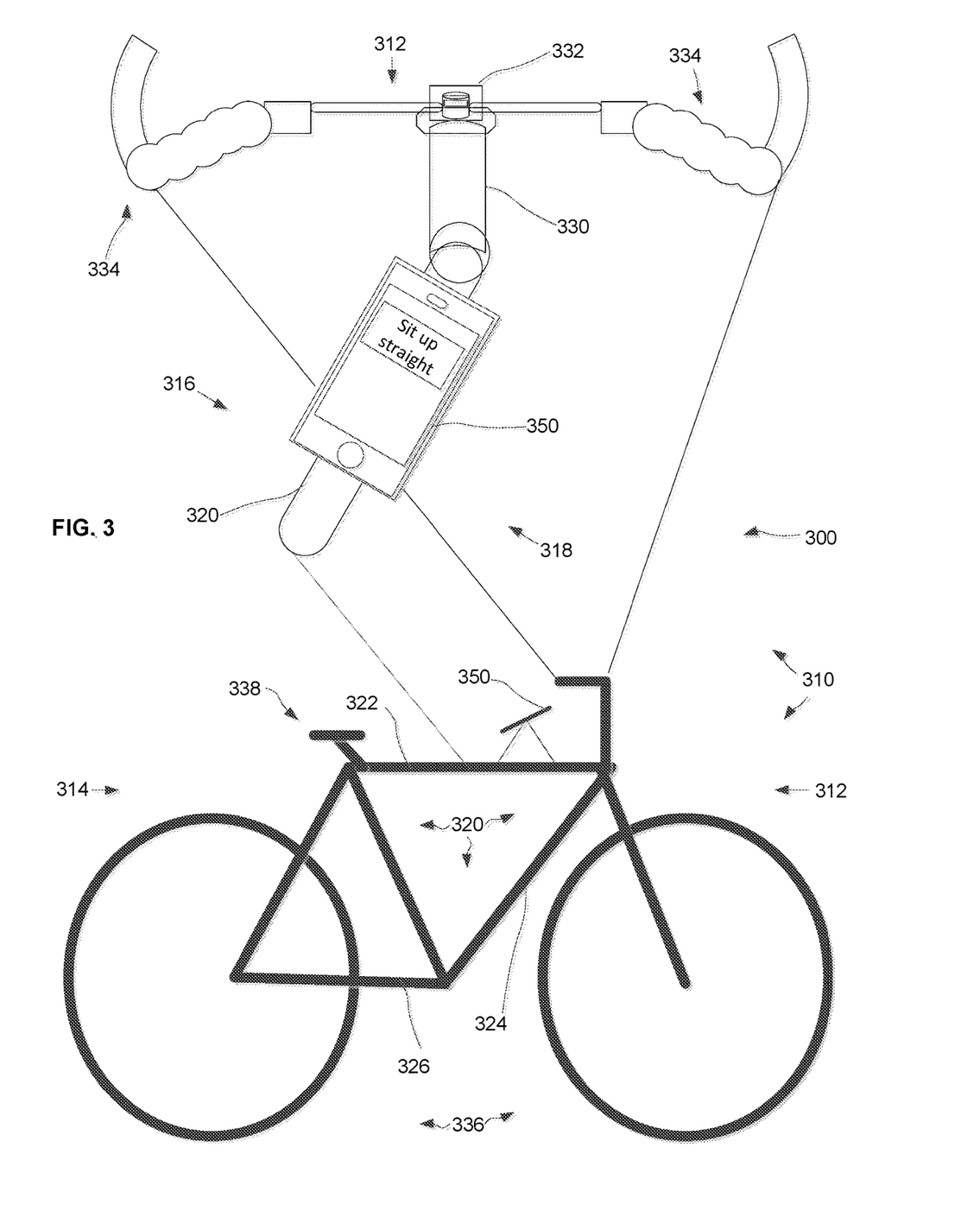
FIG. 3 depicts a setting in which users may manage their cycling performance with the use of a bicycle, consistent with embodiments of the present disclosure.

FIG. 3 depicts a setting 300 in which users may manage their cycling performance with the use of a bicycle 310, consistent with embodiments of the present disclosure. The bicycle 310 may include a front side 312 and a back side 314; and a left side 316 and a right side 318. The bicycle 310 may include a frame 320. The frame 320 may include various components such as a top tube 322, a down tube 324, and a chain stay 326. The bicycle 310 may also include a headset 330, a stem 332, handlebars 334, wheels 336, a seat 338, and a sensor (not depicted) to detect performance of the bicycle.

The sensor may comprise one or more motion sensors, including accelerometers, gravity sensors, gyroscopes, vibration sensors, position sensors, and rotational vector sensors. The sensor may also comprise goniometers, magnetometers, and barometers. The sensor may also include camera sensors, GPS, position sensors, and environmental sensors that detect temperature, air pressure, elevation, and humidity. The sensor may also include force, pressure, or biometric sensors. The sensor may further be configured to communicate with a user input device (not depicted), and a user output device (not depicted). Sensor readings from the one or more sensors may contribute to a calculation of tilt.

Sensor readings may be communicated as a notification to the user through the user output device, such as a light or an analog needle (e.g., a needle pointing to a number). In some embodiments, the sensor may be a first computing device 350 that contains the user input device and user output device, such as a smartphone with a built-in touchscreen.

The sensor may be a device configured to detect cycling performance, such as cyclist tilt. Cyclist tilt may be the angle of the bicycle 310 or cyclist orientation while riding is occurring. Orientation of the bicycle 310 may comprise forward, backward, or to either side. In a first example, orientation may be that the bicycle is tilted eleven degrees towards the left side 316. In a second example, orientation may be that the bicycle is tilted four degrees towards the right side 318. Tilt may be calculated based on one or more sensors. A given sensor of the one or more sensors may detect real-time tilt readings, which may be referred to as sensor readings. Examples of sensors that may contribute to cyclist tilt comprise accelerometers, gyroscopes, gravity sensors, rotational vector sensors, vibration sensors, position sensors, magnetometers, barometers, and other motion detecting sensors.

The sensor may be attached temporarily to any part of the frame of the bicycle 310. In some embodiments, the sensor may be irremovably mounted to the frame 320 of the bicycle 310. The sensor may be fastened to the top tube 322, the down tube 324, or the chain stay 326. Straps capable of mounting the sensor to the frame 320 of the bicycle 310 may be used. The sensor may be mounted using hook-and-loop fabric fasteners, clamps, buttons, ropes, or nylon so that the sensor remains located on the frame 320 of the bicycle 310. In some embodiments, the sensor may be mounted to the headset 330, the stem 332, the handlebars 334, one or both of the wheels 336, the seat 338, or another component of the bicycle 310.

In some embodiments, such as where a sensor has been attached to the headset 330, a calibration may be required. This calibration may have been different if a sensor was attached to the frame 320 of the bicycle 310, such as the top tube 322, down tube 324, or chain stay 326. The calibration may be required due to one or more interferences, such as bumps and natural turns that occur during cycling. The calibration may improve tilt calculation and determination by negating the interferences in tilt due to turning or bumps.

The calibration may be performed automatically by a sensor. In some embodiments, calibration may be performed through the user input device. In a first example, the user input device is a microphone, and after a verbal input from the user speaking into the microphone calibration may be performed. In a second example, the user input device may be a mechanical switch or button configured to accept touch or movement from a user to perform calibration. Calibration may also be performed by a user touching a button, by shaking, or by launching an application from a user interface of the first computing device 350.

In some embodiments, one or more components of the frame 320 of the bicycle 310 may be formed to integrally couple or attach to the sensor. For example, a hole or cavity may be formed into the frame 320 to accept the sensor and prevent movement of the sensor to any of the sides of the bicycle 310 (e.g., to the left side 316 or right side 318). In some embodiments, a hole may be drilled into the frame of the bicycle 310. The hole may be drilled into the frame 320 of the bicycle 310, including the top tube 322, down tube 324, and chain stay 326. The hole may also be drilled into the pedals (not depicted), headset 330, stem 332, handlebars 334, wheels 336, or seat 338. There may be more than one hole drilled. One or more sensors may be permanently attached to a hole or multiple holes by a strap, glue, or by a fastening scheme comprising ridges. In some embodiments, a sensor may be attached at or near the pedals (not depicted) or wheels 336 to determine speed or road friction. For example, the tire of the bicycle may be worn too low causing a lack of traction with the road. In some embodiments, a sensor may be a cover or sleeve (e.g., a handlebar sleeve including a user output device configured with haptic peripheral capabilities).

In some embodiments, a groove or cavity may be formed at the time of construction of the bicycle 310. For example, sensors may have been molded, shaped, or formed into the bicycle 310. The sensors may be removable, adjustable, or permanently fixed onto the bicycle 310. For example, a sensor, such as a barometer, may slide into the top tube 322 and temporarily lock into place. In some embodiments, a sensor, such as a GPS, may be permanently attached to the stem 332. Sensors that detect the pressure of the air in the wheels 336 may be removably, adjustably, or permanently fixed onto, beside, or near the wheels.

In some embodiments, if a user is cycling, then the sensors may make detections for a calculation of tilt (such as discussed in FIG. 1). The sensor may be communicatively coupled to a user output device. The user output device may include one or more of the following: speakers, analog needles, LCD displays, colored light emitting diodes (LEDs), etc. If the detected cyclist tilt suggests that the cyclist is successfully completing tasks and goals, then the user output device may be visually communicated to the cyclist to indicate cyclist status is optimal. For example, the user output device may be a green light. Continuing the example, if the bicycle is tilted less than four degrees to the left side 316 or four degrees to the right side 318, then the green light may illuminate to indicate that the cyclist is succeeding. In a second example, the user output device may be a red light. Continuing the second example, if the tilt calculations suggest that the cyclist is not cycling in the most optimal way, then the red light may illuminate to visually communicate to the cyclist to alter riding of the bicycle 310.

In some embodiments, multiple user output devices that operate as haptic peripherals may be used. For example, the original handlebars 334 that were installed on the bicycle 310 when the bicycle was manufactured may have been replaced with vibrating handlebars 334. Cyclist tilt may trigger the handlebar 334 on the right side 318 to vibrate if the cyclist is leaning over 8.5 degrees to the right. Some embodiments may include a multipart user output device. For example, if cyclist tilt calculations are approaching the threshold permitted for cycling on a straight road (e.g., the threshold may suggest that the bicycle 310 will no longer remain in balance) then a red light may flash repeatedly until the tilt calculations reach permissible range. Once the permissible range has been reached, the red light may stop flashing and a green light may begin to flash to notify a user that cyclist status is now optimal.

In some embodiments, if cyclist tilt suggests that a cyclist is successfully completing tasks and goals, then badges, stars, or discounts from participating entities may be received by a user through a user output device (e.g., a smartphone). The user output device may permit sharing of badges and stars between users through a social network. Badges and stars may be related to the gender of the cyclist, such as by utilizing badges of a color related to a specific gender. The user output device may indicate whether cyclist status is optimal. For example, if the tilt calculations suggest that the cyclist is not cycling in the most optimal way, then the user output device may notify a user by audio feedback, visual messages, or haptic peripherals. User output devices may transmit notifications to multiple users. For example, if the first and second user output device is a smartphone, the first user output device may transmit a textual notification to a cyclist that cycling status is optimal. Simultaneously, the second user output device may transmit a textual notification to an observer that cycling status of the cyclist is optimal.

Figure 4:
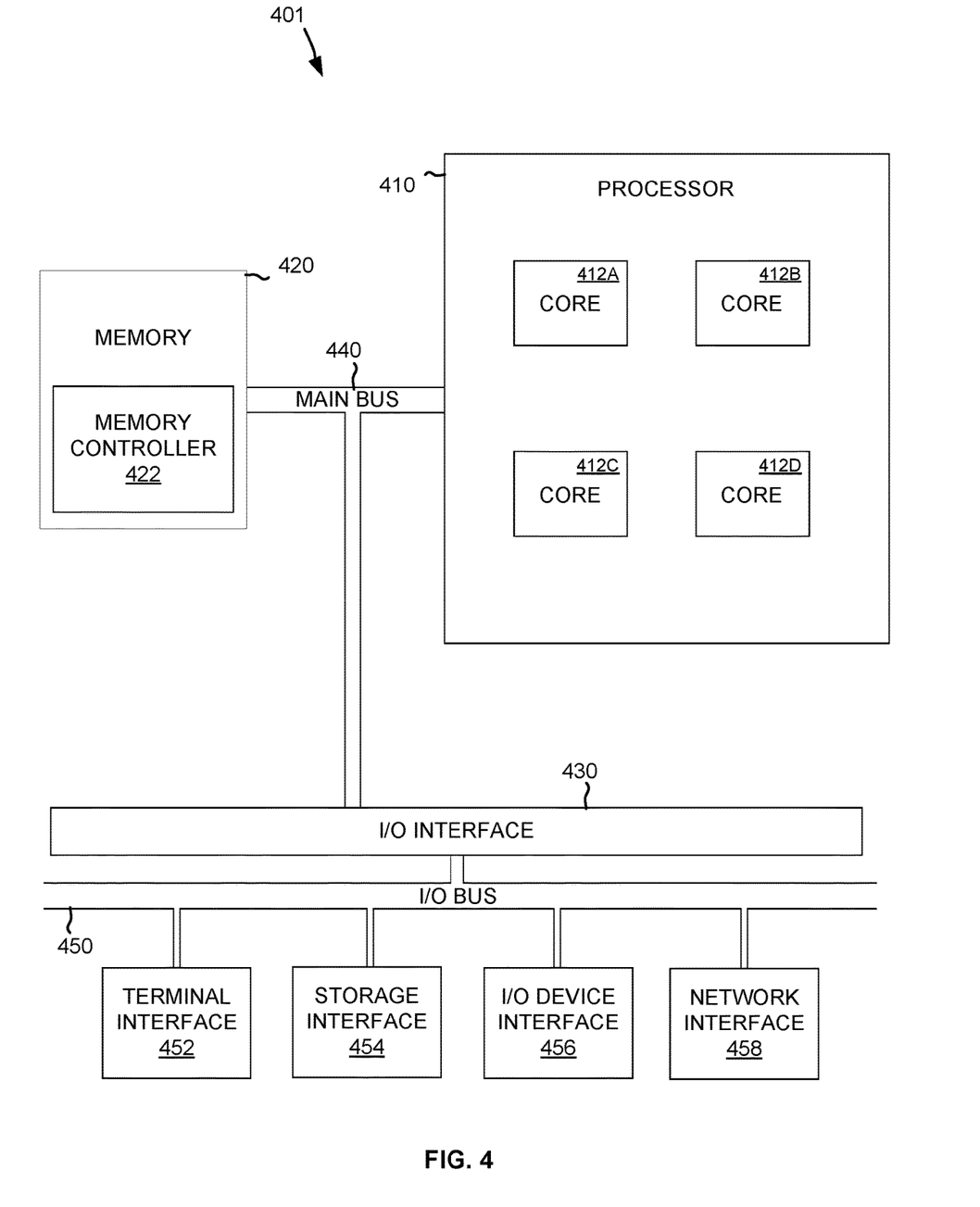
FIG. 4 depicts the representative major components of an example computer system 401 that may be used, in accordance with embodiments of the present disclosure.

FIG. 4 depicts the representative major components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The invention claimed is:

1. A system for cycling management comprising:
a bicycle, the bicycle comprising:
  a frame having at least a top tube, handlebars, and a seat;
  a first sensor cavity integrally formed in the frame, wherein the first sensor cavity is located horizontally along the interior of the top tube, wherein the first sensory cavity is configured to affix at least one sensor of a plurality of sensors, wherein the first sensor cavity is formed at time of construction of the bicycle; and
  a second sensor cavity integrally formed in the frame, wherein the second sensor cavity is located along the interior of the handlebars, wherein the second sensory cavity is configured to affix at least one sensor of a plurality of sensors; and
  a third sensor cavity integrally formed in the frame, wherein the third sensor cavity is located along the interior of the handlebars opposite to the second sensor, wherein the third sensory cavity is configured to affix at least one sensor of a plurality of sensors;
a first sensor of the plurality of sensors configured to detect cyclist tilt, wherein the first sensor is affixed to the first sensor cavity;
a second sensor of the plurality of sensors configured to detect pressure of a cyclist right hand, wherein the second sensor is affixed to the second sensor cavity;
a third sensor of the plurality of sensors configured to detect pressure of a cyclist left hand, wherein the third sensor is affixed to the third sensor cavity,
wherein the of the plurality of sensors are powered by a vibration-to-electricity microelectromechanical system and a battery;
a force-feedback haptic motor, the force-feedback haptic motor affixed to the seat of the bicycle; and
a computing device, the computing device integrally coupled to the bicycle, the computing device configured to perform a method comprising:
  receiving sensor readings from the plurality of sensors, wherein the plurality of sensors detect cyclist tilt;
  determining, based on the sensor readings from the plurality of sensors, cyclist status, and wherein the cyclist status is that the cyclist is leaning beyond a balance threshold while seated on the bicycle; and
  communicating, based on the determined cyclist status, a notification, and wherein the notification is for the cyclist to not take a route with elevation changes provided by the haptic motors.

2. The system of claim 1, wherein the one or more sensors are powered by a wireless charging device.

3. The system of claim 1, wherein the computing device is attached to the top tube of the frame.

4. The system of claim 3, wherein the system further comprises:
a light emitting diode (LED), the LED communicatively coupled to the computing device, the LED configured to perform the following:
blinking in response to receiving the notification from the computing device.

5. The system of claim 1, wherein the bicycle further comprises a haptic seat, and wherein the communicating is performed by the haptic seat.

6. The system of claim 1, further comprising a plurality of seat sensors, wherein the plurality of seat sensors includes at last two seat sensors configured to detect pressure of a seat of the bicycle, and wherein the determining the cyclist status is further based on the plurality of seat sensors.

7. A system for cycling management comprising:
a bicycle, the bicycle comprising:
  a frame having at least a top tube, handlebars, and a seat;
  a first sensor cavity integrally formed in the frame, wherein the first sensor cavity is located horizontally along the interior of the top tube, wherein the first sensory cavity is configured to affix at least one sensor of a plurality of sensors, wherein the first sensor cavity is formed at time of construction of the bicycle; and
  a second sensor cavity integrally formed in the frame, wherein the second sensor cavity is located along the interior of the handlebars, wherein the second sensory cavity is configured to affix at least one sensor of a plurality of sensors; and a third sensor cavity integrally formed in the frame, wherein the third sensor cavity is located along the interior of the handlebars opposite to the second sensor, wherein the third sensory cavity is configured to affix at least one sensor of a plurality of sensors;

a first sensor of the plurality of sensors configured to detect cyclist tilt, wherein the first sensor is affixed to the first sensor cavity;

a second sensor of the plurality of sensors configured to detect pressure of a cyclist right hand, wherein the second sensor is affixed to the second sensor cavity;

a third sensor of the plurality of sensors configured to detect pressure of a cyclist left hand, wherein the third sensor is affixed to the third sensor cavity, wherein the of the plurality of sensors are powered by a vibration-to-electricity microelectromechanical system and a battery;

a force-feedback haptic motor, the force-feedback haptic motor affixed to the seat of the bicycle; and a computing device, the computing device integrally coupled to the bicycle, the computing device configured to perform a method comprising:

receiving sensor readings from the plurality of sensors, wherein the plurality of sensors detect cyclist tilt;

determining, based on the sensor readings from the plurality of sensors, cyclist status, and wherein the cyclist status is that the cyclist is leaning beyond a balance threshold while seated on the bicycle; and communicating, based on the determined cyclist status, a notification provided by the force-feedback haptic motors.

* * * * *